US012521580B1

(12) United States Patent
Cornelius et al.

(10) Patent No.: US 12,521,580 B1
(45) Date of Patent: Jan. 13, 2026

(54) ELECTRONIC FILTER AND MASK

(71) Applicant: Advance Technology, Inc., Tigard, OR (US)

(72) Inventors: Jack C. Cornelius, Tigard, OR (US); Bryan Kelly, Lake Oswego, OR (US)

(73) Assignee: Advance Technology, Inc., Tigard, OR (US)

( * ) Notice: Subject to any disclaimer, the term of this patent is extended or adjusted under 35 U.S.C. 154(b) by 939 days.

(21) Appl. No.: 17/724,910

(22) Filed: Apr. 20, 2022

Related U.S. Application Data

(60) Provisional application No. 63/179,182, filed on Apr. 23, 2021.

(51) Int. Cl.
*A62B 18/02* (2006.01)
*A62B 7/10* (2006.01)
*A62B 18/08* (2006.01)
*A62B 23/02* (2006.01)

(52) U.S. Cl.
CPC ................ *A62B 18/02* (2013.01); *A62B 7/10* (2013.01); *A62B 18/08* (2013.01); *A62B 23/02* (2013.01)

(58) Field of Classification Search
CPC ........... A62B 18/02; A62B 7/10; A62B 18/08; A62B 23/02; F24F 13/28; B03C 1/023; B03C 3/00
See application file for complete search history.

(56) References Cited

U.S. PATENT DOCUMENTS 7,392,806 B2 7/2008 Yuen et al.
9,638,845 B2 5/2017 Song
10,261,420 B2 4/2019 Kim et al.
11,103,668 B2 * 8/2021 Duveen ............... A61M 16/106
2003/0110944 A1 6/2003 Wu et al.
2008/0229929 A1 * 9/2008 Marcoon ............ B01D 46/0028 264/340

(Continued)

FOREIGN PATENT DOCUMENTS

CN 105249569 * 1/2016 ............ A41D 13/11
CN 111973903 * 11/2020 ............ A41D 13/11

OTHER PUBLICATIONS

CN105249569_machine_translation_accessed_May 5, 2025 (Year: 2025).*

(Continued)

*Primary Examiner* — Victoria Murphy
*Assistant Examiner* — Kris Hanyu Gong
(74) *Attorney, Agent, or Firm* — Howard Russell

(57) ABSTRACT

Battery-powered smart electronic Air Filter Module (AFM) adapted for retention in an orifice of a face mask and adapted to be positioned in front of the user's mouth for prevention of transmission to or from the wearer of harmful particulates, bacteria, and viruses with less impediment of the wearer's breathing or speaking, comprising: an electrostatic field (EF) generator, an electromagnetic field (EMF) generator under intelligent breath sensor control adjacent the EF generator and adapted for providing directional polarization to particles ionized by the EF generator, anterior and posterior porous frame portions retaining the EF generator, and an electronic microcontroller system operatively connected with, and adapted to selectively energize, the EF generator and the EMF generator.

21 Claims, 11 Drawing Sheets

(56) References Cited

U.S. PATENT DOCUMENTS

| | | | | |
|---|---|---|---|---|
| 2009/0274592 | A1* | 11/2009 | Bergeron | H01J 37/32568 422/186.04 |
| 2021/0140447 | A1* | 5/2021 | Latulippe | H02K 7/14 |
| 2021/0219636 | A1* | 7/2021 | Stroiazzo-Mougin | A62B 23/02 |
| 2021/0298391 | A1* | 9/2021 | Keene | A41D 13/1107 |
| 2022/0062664 | A1* | 3/2022 | Yuen | B03C 3/08 |
| 2022/0184433 | A1* | 6/2022 | Curtis | B01D 45/16 |

OTHER PUBLICATIONS

CN111973903_machine_translation_accessed_May 5, 2025 (Year: 2025).*

* cited by examiner

ELECTRONIC FILTER AND MASK

CONTINUITY AND CLAIM OF PRIORITY

This US Non-provisional patent application claims the benefit and priority of U.S. Provisional Patent Application Ser. No. 63/179,182, filed 23 Apr. 2021.

FIELD

The invention relates to a mask for prevention of very fine particulate matter, such as viruses, bacteria, and other harmful substances, often times carried on water droplets and aerosols, from entry into a wearer's mouth or nose and from passage from the wearer's mouth and nose to their external environment, and more particularly to an electronically enabled mask system used to charge, repel, and divert pathogen laden moisture droplets and aerosols from entering the person's mouth or nose and from passage from the wearer's mouth and nose to the ambient environment.

BACKGROUND

As rising disease prevalence has become apparent and a clearer understanding that "both pre-symptomatic and asymptomatic transmission of disease are possible—even common—studies have confirmed that viral load peaks in the days before symptoms begin, and that speaking is enough to expel virus-carrying droplets. See, Univ. of Cal. San Francisco, Author Nina Bai, Still Confused About Masks?Here's the Science Behind How Face Masks Prevent Coronavirus, Jun. 26, 2020, updated Jul. 11, 2020, San Francisco, CA USA, https://www.ucsf.edu/news/2020/06/417906/still-confused-about-masks-heres-science-behind-how-face-masks-prevent.

It has been established by the Centers for Disease Control (CDC), the World Health Organization (WHO), and other medical organizations, that masks are highly effective to prevent viral and bacterial contagion spread. Further, "Americans are increasingly adopting the use of cloth face masks to slow the spread of COVID-19, and the latest science may convince even more to do so." See, Centers for Disease Control and Prevention, CDC calls on Americans to Wear Masks to Prevent COVID-19 Spread, Jul. 14, 2020, Atlanta, GA, USA https://www.cdc.gov/media/releases/2020/p0714-americans-to-wear-masks.html (CDC calls on Americans to Wear Masks to Prevent Covid-19 Spread); Public Health Nigeria, Do Face Masks Expire?, Sep. 11, 2020, Nigeria, https://www.publichealth.com.ng/do-face-masks-expire/(Evidence of mask effectiveness in preventing transmission of COVID-19).

There are also several strands of evidence supporting the efficacy of masks to prevent the spread of COVID-19 in particular. See, Howard, Jeremy & Huang, Austin & Li, Zhiyuan & Tufekci, et al., 2020, Face Masks Against COVID-19: An Evidence Review. 10.20944/preprints 202004.0203.v2. One category of evidence comes from laboratory studies of respiratory droplets and the ability of various masks to block them. An experiment using high-speed video found that hundreds of droplets ranging from 20 to 500 micrometers were generated when saying a simple phrase, but that nearly all these droplets were blocked when the mouth was covered by a damp washcloth. See, The New England Journal of Medicine, Philip Anfinrud, Ph.D., Christina E. Bax, B. A., Adriaan Bax, Ph.D., Visualizing Speech-Generated Oral Fluid Droplets with Laser Light Scattering, May 21, 2020, Bethesda, MD 382:2061-2063, DOI: 10.1056/NEJMc2007800, https://www.nejm.org/doi/full/10.1056/NEJMc2007800

Another study of people who had influenza or the common cold found that wearing a surgical mask significantly reduced the amount of these respiratory viruses emitted in droplets and aerosols. Leung, N. H. L., Chu, D. K. W., Shiu, E. Y. C. et al. Respiratory virus shedding in exhaled breath and efficacy of face masks. Nature Medicine 26, 676-680, Apr. 3, 2020, https://doi.org/10.1038/s41591-020-0843-2.

But some of the strongest evidence in favor of masks come from studies of real-world scenarios. See, Health Affairs, Vol. 39, No. 8: COVID-19, Home Health & More, Wei Lyu and George 1. Wehby, Community Use of Face Masks and Covid-19: Evidence From a Natural Experiment of State Mandates in the US, Jun. 16, 2020, Bethesda, MD, https://www.healthaffairs.org/doi/10.1377/hlthaff.2020.00818; Researchgate, Christopher Leffler, Edsel Ing, Joseph Lykins, et al, Jun. 15, 2020, Richmond, Virginia, USA, Association of country-wide coronavirus mortality with demographics, testing, lockdowns, and public wearing of masks, See, https://www.researchgate.net/publication/342198360_Association_of_country-wide_coronavirus_mortality_with_demographics_testing_lockdowns_and_public_wearing_of_masks_Update_June_15_2020; see, The Washington Post, Todd C. Frankel, The outbreak that didn't happen: Masks credited with preventing coronavirus spread inside Missouri hair salon, Jun. 17, 2020, Springfield, MO, USA, see, https://www.washingtonpost.com/business/2020/06/17/masks-salons-missouri/ (masks prevented transmission of Covid-19 in a hair salon); see, Canadian Medical Association, CMAJGROUP, Joule Inc., Kevin L Schwartz, et al., Lack of COVID-19 transmission on an international flight, Apr. 14, 2020, Calgary and Alberta, Canada, https://vwww.cmaj.ca/content/192/15/E410 (mask prevented transmission of Covid-19 on an international flight).

Thus, the latest science, as well as real world experience, affirms that cloth face coverings are a tool in the fight against COVID-19 and other viral and bacterial infections, and such face masks could reduce the spread of disease, particularly when used universally within communities. Accordingly, there is increasing evidence that cloth face coverings help prevent people who have COVID-19 from spreading the virus to others. See, Army Public Health Center, APHC "Wearing masks to prevent COVID-19 spread: Cloth face coverings are one of the most powerful weapons we have to slow and stop the spread of the virus", Jul. 15, 2020, Aberdeen Proving Ground, MD, https://phe.amedd.army.mil/news/aph/Pages/APHWU-17July2020-.aspx ("cloth face coverings one of the most powerful weapons to slow and stop the spread of the virus").

The growing body of evidence is that cloth face coverings provide source control—that is, they help prevent the person wearing the mask from spreading viral diseases to others. Thus, the main protection individuals gain from masking occurs when others in their communities also wear face coverings. Accordingly, it would be highly beneficial from a public health perspective if improvements to both effectiveness and comfort during wear were to be made to prior art face masks. See, Centers for Disease Control and Prevention, CDC calls on Americans to Wear Masks to Prevent COVID-19 Spread, Jul. 14, 2020, Atlanta, GA, USA https://www.cdc.gov/media/releases/2020/p0714-americans-to-wear-masks.html (CDC calls on Americans to Wear Masks to Prevent Covid-19 Spread).

While studies have compared various mask materials, for the general public the most important consideration may be comfort. Thus, it is often said that the best mask is one that may be worn comfortably and consistently. . . . See, Univ. of Cal. San Francisco, Author Nina Bai, Still Confused About Masks?Here's the Science Behind How Face Masks Prevent Coronavirus, Jun. 26, 2020, updated Jul. 11, 2020, San Francisco, CA USA, https://www.ucsf.edu/news/2020/06/417906/still-confused-about-masks-heres-science-behind-how-face-masks-prevent.

While N95 respirators are only necessary in medical situations such as intubation, surgical masks are generally more protective than cloth masks, and some people find them lighter weight and more comfortable to wear. See, Univ. of Cal. San Francisco, Author Nina Bai, Still Confused About Masks?Here's the Science Behind How Face Masks Prevent Coronavirus, Jun. 26, 2020, updated Jul. 11, 2020, San Francisco, CA USA, https://www.ucsf.edu/news/2020/06/417906/still-confused-about-masks-heres-science-behind-how-face-masks-prevent; Public Health Nigeria, Do Face Masks Expire?, Sep. 11, 2020, Nigeria, https://www.publichealth.com.ng/do-face-masks-expire/(Evidence of mask effectiveness in preventing transmission of COVID-19).

An important concept and distinction to be stressed when evaluating the efficacy of masks, pertains to risk reduction rather than absolute prevention of transmission. No currently available cloth, or paper, masks available are 100% effective at elimination transmission of viruses and bacteria. See, Univ. of Cal. San Francisco, Author Nina Bai, Still Confused About Masks?Here's the Science Behind How Face Masks Prevent Coronavirus, Jun. 26, 2020, updated Jul. 11, 2020, San Francisco, CA USA, https://www.ucsf.edu/news/2020/06/417906/still-confused-about-masks-heres-science-behind-how-face-masks-prevent; University of Minnesota, Center for Infectious Disease Research and Policy, Mary Van Beusekom, Data do not back cloth masks to limit COVID-19, experts say, Apr. 9, 2020, Minneapolis, MN, https://www.cidrap.umn.edu/news-perspective/2020/04/data-do-not-back-cloth-masks-limit-covid-19-experts-say And while one doesn't throw up their hands and give up wearing a mask if they think the mask is not 100 percent effective, see, Id., it still would be considered highly beneficial if the percentage of effectiveness of, say, an N95 mask (proven 95% effective when worn properly to prevent transmission of particles down to 0.3 micrometers in size) could be improved upon in terms of a mask which is comparable to an N95 mask in effectiveness of protecting the mask user, but is significantly more comfortable for the mask user because it would less impede breath and speaking of the user, and it would also prevent transmission of harmful particulates from the mask user to the ambient environment. See, ScienceDirect, Elsevier, C. Raina MacIntyre, Quanyi Wang, et al., Volume 62, Pages 1-7, Efficacy of face masks and respirators in preventing upper respiratory tract bacterial colonization and co-infection in hospital healthcare workers, May 2014, https://www.sciencedirect.com/science/article/pii/S0091743514000322

Masks deemed COVID-19 and medically compliant, and other more efficient masks, however present significant user discomfort in the forms of restriction of breath and limiting of O2 intake. Such masks tend to retain $CO_2$ and breath moisture within an inside cavity of the mask. And while these problems may be circumvented by introduction of valves in the mask, which essentially permit unrestricted exhale, such masks with such valves are nevertheless not recommended, and in some cases they are not even permitted by medical institutions and local governments. This is because of the fact that such masks with valves protect the wearer from viral particulates, but they do not protect others from the wearer, since some valves permit essentially unrestricted exhale. See, Dept. of Public Health, City and County of San Francisco, Masks and face coverings for the coronavirus pandemic, San Francisco, CA, USA https://sf.gov/information/nasks-and-face-coverings-coronavirus-pandemic.

Thus, wearing masks can be considered by many to be undesirable and uncomfortable, since many report that especially long-term wearing of masks increases the amount of moisture trapped within the mask, leading to discomfort and increased risk of contamination. Skeptics of mask wearing suggest that the apertures in cloth, and even surgical, masks are larger than viruses, thus leading to the common ill-informed argument that masks are generally ineffective, and they tend to only protect others from contaminated persons, rather than protecting the wearer from other contaminated persons.

What such arguments fail to recognize, is that most viruses and bacteria are transmitted on larger water droplet molecules expelled from persons' mouths, and which capable of remaining airborne for some time, whereas a common cloth or paper mask would trap such water droplets (along with the viruses and bacteria being carried by the water droplets).

Further, many report disliking the negative impact that wearing a mask can have on breathing and O2 intake, as well as reported increased CO2 levels within the mask, leading to light-headedness, dizziness, and distorted thinking after longer periods of wear. See, Medium.com, Aalim Elitou, Doctor shares the potential Dangers of wearing a face mask, Jun. 19, 2020, https://medium.com/theusareviewer/the-potential-dangers-of-wearing-a-face-mask-51b9b86980a Accordingly, there is a need for a mask which is not only more comfortable, able to resist or dissipate moisture within the mask after longer periods of wear, but which has intelligent electronic filtering technology with improved high prevention rate of transmission of hazardous particulates, such as viruses or bacteria, either upon breathing them in through the mask, or upon exhaling them out through the mask. Such a smart mask would be capable of manual cleaning and self-sterilization to eliminate contaminated surfaces or odors on and within the mask, but ideally such a mask would also resist such contamination and development of odors after longer periods of use.

SUMMARY

In accordance with an aspect and embodiment of the disclosure, there is provided an smart electronic-enabled Air Filter Module (AFM) adapted for use with a face mask for being worn on a user's face and enclosing the user's nose and mouth, the face mask defining an orifice adapted for retaining the AFM and positioned in front of the user's mouth when wearing the mask, the AFM adapted for prevention of very fine particulate matter, which may carry viruses, bacteria, and other harmful substances from entry into a wearer's mouth and nose from the wearer's environment, and for prevention of passage of such very fine particulate matter from the wearer's mouth and nose into the wearer's environment. The AFM helps accomplish this with less impediment of a wearer's breathing or speaking. The AFM comprises: an electrostatic field (EF) generator, an electromagnetic field (EMF) generator adjacent the EF generator and adapted for providing directional polarization to particles ionized by the EF generator, anterior and posterior porous frame portions, the EF generator being retained within the porous frame portions, the porous frame portions adapted for being retained within the orifice defined in the face mask. The AFM further comprises a microcontroller electronic system adapted to be battery powered and operatively connected with, and adapted to selectively energize, the EF generator and the EMF generator.

Preferably, at least a portion of the porous frame portions of the AFM are comprised of polytetrafluoroethylene (PTFE) or similar hydrophobic material. Further, preferably, the porous frame portions of the AFM further comprise oligodynamic material for killing live pathogen particles after they come in contact with the porous frame portions.

In an accordance with another aspect and embodiment of the disclosure, there is provided a previously-described AFM, wherein the AFM further comprises: a breath parameter sensor, and an electronic circuit connected to the breath parameter sensor and the EMF generator adapted for reversing polarity of the EMF generator responsive to a detected breath parameter of exhalation or inhalation.

In accordance with this aspect and embodiment of the AFM, preferably the breath parameter sensor and the electronic circuit are adapted for varying the amplitude of the reversing polarity of the EMF generator responsive to detected breath parameters and status within the mask. Further, in accordance with another aspect and embodiment of the disclosure, the AFM assembly further preferably comprises a single-layer and porous dielectric medium to enhance the capacity of the EF and to provide stability of the AFM.

In accordance with another aspect and embodiment of the disclosure, there is provided at least one AFM carried on a face mask, wherein the at least one AFM and face mask in combination, comprise: a face covering member adapted for being worn on a user's face and enclosing the user's nose and mouth, the face mask defining an orifice adapted to be positioned in front of the user's mouth when wearing the mask. In this embodiment, preferably at least one AFM is optionally removably retained within the orifice of the face covering member (or each of a plurality of AFMs may be optionally removably retained with a corresponding plurality of orifices in the face covering member).

Further, in accordance with an aspect and embodiment of the disclosure, the electronic system of the at least one AFM and face mask combination is provided to selectively energize the at least one AFM and comprises an automated ON and OFF switch adapted to be operable upon detection of donning and doffing, respectively, of the mask.

Further, in accordance with this aspect and embodiment, the combination at least one AFM and face mask preferably comprises a UV LED panel for in-situ sterilization of the at least one AFM and other internal areas of the mask. Still further, preferably such a UV LED panel may be optionally manually selected to ON for a default sterilization time, and preferably the default sterilization time may be overridden by a user specified time. Yet further, the at least one AFM and face mask combination described above may comprise a battery removably attachable to the mask and is adapted for powering the mask.

Thus, in accordance with one or more aspects of the disclosure, there is provided an embodiment of an electronically-enabled mask adapted for prevention of very fine particulate matter, which may carry viruses, bacteria, and other harmful substances, from entry into a wearer's mouth and nose from the wearer's environment, and for prevention of passage of such very fine particulate matter from a wearer's mouth and nose into the wearer's environment. Such an electronically-enabled mask accomplishes this with less impediment of the wearer's breathing or speaking, and such an electronically-enabled mask comprises: a face covering member defining an orifice adapted to be positioned during wear so as to define a cavity in front of the wearer's mouth while also making an airtight enclosure around the wearer's nose and mouth and so as to channel all of the wearer's breath to pass through the orifice. The electronically-enabled mask further comprises at least one AFM optionally removably retained and sealed around a periphery thereof within the orifice opening of the face covering member.

The at least one AFM of this embodiment of the electronically-enabled mask comprises: an EF generator, an EMF generator adjacent the EF generator and adapted for providing directional polarization to particles ionized by the EF generator. The at least one AMF further comprises: anterior and posterior porous frame portions, the EF generator being retained within the porous frame portions, the porous frame portions adapted for being retained within the orifice defined in the face mask, and an electronic system adapted to be battery powered and operatively connected with, and adapted to selectively energize, the EF generator and the EMF generator. The combination at least one AMF and mask in accordance with this aspect and embodiment of the disclosure further comprises a battery optionally removably attached to the face covering member and adapted for powering the mask.

Preferably, in the electronically-enabled mask of this embodiment, the at least one AFM further comprises anterior and posterior membrane filter portions having oligodynamic properties for killing live viruses coming into contact with the membrane filter portions.

In accordance with another aspect and embodiment of the disclosure, the electronically-enabled mask further comprises: a breath parameter sensor; and an electronic circuit connected to the breath parameter sensor and the EMF generator adapted for reversing polarity of the EMF generator responsive to a detected breath parameter of exhalation or inhalation.

Further, in accordance with this embodiment, the breath parameter sensor and the electronic circuit are preferably adapted for varying the amplitude of the reversing polarity of the EMF generator responsive to a detected breath parameter of relative pressure within the mask. Still further, the electronic system of the mask of this embodiment is adapted to selectively energize the at least one AFM and comprises an automated ON and OFF switch adapted to be operable upon detection of donning and doffing, respectively, of the mask. Such a mask further preferably comprises a UV LED panel for in-situ sterilization of the at least one AFM, and the UV LED panel may be optionally manually selected to ON for a default sterilization time, it being the case that the default sterilization time may preferably be overridden by a user specified time. Regarding such UV sterilization control, preferably available battery power will be monitored to reserve battery power to permit a sterilization sequence. Still further, preferably the at least one AFM of the mask of this embodiment preferably further comprises a single-layer and porous dielectric medium to enhance the capacity of the EF generator and provide stability of the at least one AFM.

As used in this disclosure, the term "breath parameters" refers to important aspects of a mask wearer's exhalation and inhalation relative to the mask interior, whether inhalation is in through the mask and into the wearer's mouth and/or nose, or exhalation is from the wearer's mouth and/or nose out through the mask. Important breath parameters comprising breath status include relative pressure caused by inhalation and/or exhalation within the mask interior, relative CO2 percentage concentration within the mask interior, and relative percent humidity detected within the mask interior. Further, a singular "breath parameter" could refer to any one of the foregoing parameters.

The various aspects and embodiments of the AFM and an electronically-enabled mask having at least one AFM, or a plurality of AFMS, address the limitations of prior art masks mentioned herein. Thus, these various aspects and embodiments of an AFM retained in a mask serve to provide a very high degree of prevention of aerosol harmful particulate matter from transmission through (to or from a wearer) the mask, all while providing less inhibition or impediment of the wearer's breathing or speaking.

The subject matter of the present invention is particularly pointed out and distinctly claimed in the concluding portion of this specification. However, both the organization and method of operation, together with further advantages and objects thereof, may best be understood by reference to the following descriptions taken in connection with accompanying drawings.

BRIEF DESCRIPTIONS OF DRAWINGS

FIG. 1 is an exploded view of an air filter module (AFM), with a breath orientation sensing enabled reversible electromagnetic field (EMF) generator, and electrostatic field (EF) generator contained within oligodynamic shield members, together with a breath orientation sensor, a UV sterilizer, and other supporting electronics, such as a lithium-ion battery and microcontroller, all adapted for use in a face mask;

DETAILED DESCRIPTION

Figure 1:
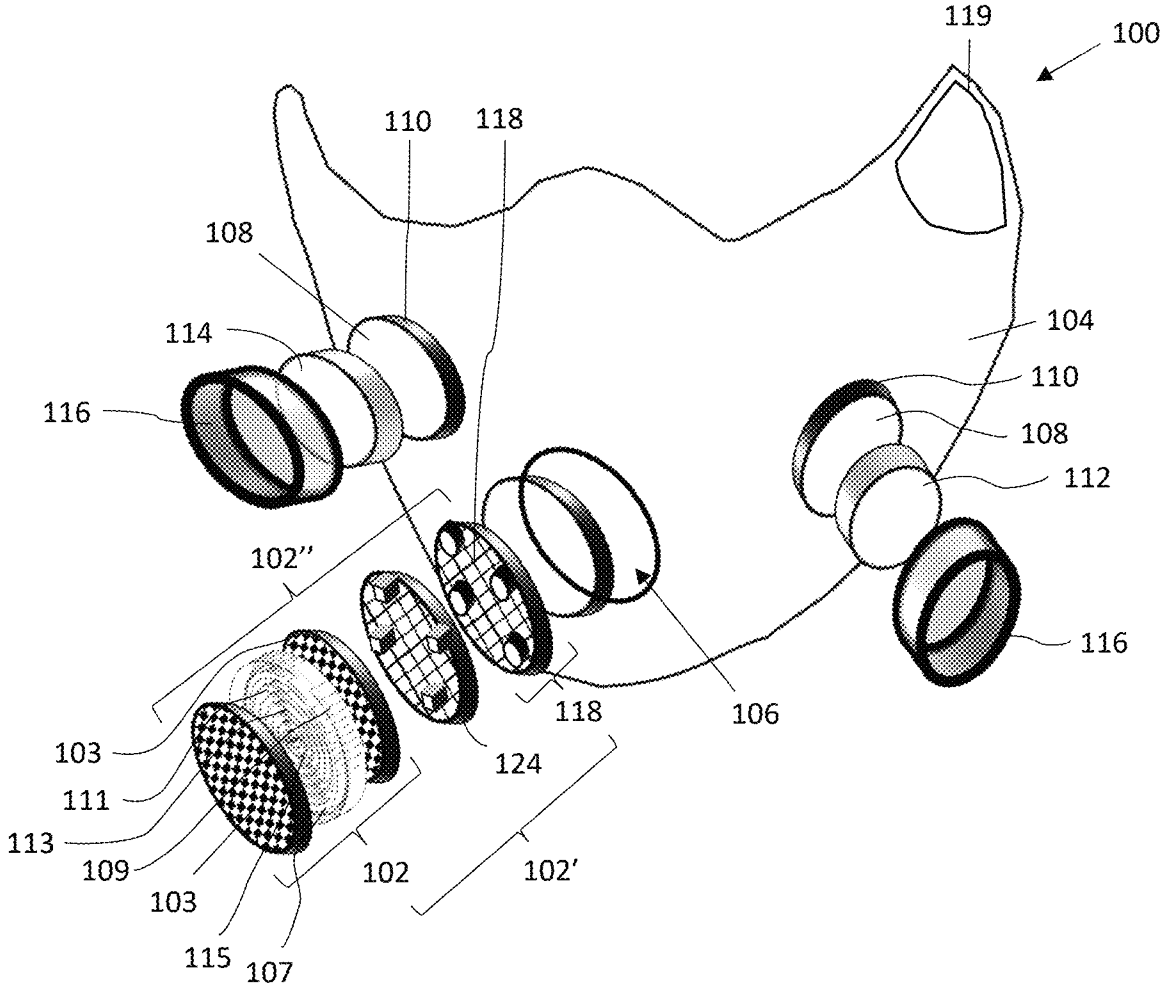

Referring now to the FIGS., there are provided various embodiments of air filter modules (AFM) 102, 102', 102" and electronic enabled masks 100. Referring specifically to FIG. 1, there is provided an electronic enabled mask 100, comprising: a mask housing, face shield, or frame member (104), the mask housing forming ear loops 119 or other means (such as neck and head straps or ties) for retaining the mask on a user's face so as to generally cover the mouth and nose regions of the face.

Each AFM 102, 102', 102" is sealed within fore and aft shield members 103, each of which may comprise oligodynamic materials incorporated therein for the killing of live virus and bacteria coming into contact with such shield members. The two shield members 103 snap together around and to enclose an EF generator 105, for example Archimedes plates, 111, and an EMF generator polarization coil 107 (reversible depending upon breath orientation detection in an embodiment of the AFM 102'), both further housed within an external annular housing 109. By application of high voltage across the EF generator plates 105, accompanied with the EMF generator polarization coil 107, particles and viral droplets and aerosol particulates in the vicinity are ionized and deflected away from the orifice 106.

As further described below in connection with FIGS. 6A, 6B, and 10A-10D, by reversing the flow of current through the EMF generator polarization coil 107, the direction of the electromagnetic field generated by the EF generator 105 may be automatically selectively reversed, depending upon ingress or egress of breath to and from the mask 104, so as to better serve to divert harmful particles from ingress or egress from the mask orifice 104, depending upon breath orientation. Still further, the magnitude and frequency of breath may be sensed to correspondingly strengthen the electromagnetic field generated by the AFM 102, 102', 102" needed to successfully divert harmful particles, in accordance of how heavy and fast the user is breathing.

The AFM embodiments 102, 102', 102", provide overlapping layers of protection, by helping divert ionized particles from entry, and exit, from the mask, as well as providing a system for optional automated UV cleansing of important mask components, oligodynamic sterilizing of important mask components, and removability for washing and or ultrasonic cleaning of components.

Because the mask permits a larger opening 106 than traditional mesh-filter openings, the mask 100 permits more natural passage of sound and easier breathing through the mask, all while achieving a high degree of prevention of passage of harmful particles into, and out of, the mask.

The mask housing 104 is preferably heat resistant, durable, and pliable, and able to maintain or return to original face-form fitting shape if accidentally sat upon or subjected to rigorous manual or automated cleansings. The mask housing 104 is preferably infused with oligodynamic and hydrophobic nanofibers and defines an orifice 106 (or multiple orifices 106) having means, such as a snap ring 117 for preferably removably and sealably mounting an AFM 102, 102', 102" into each orifice 106. The removability (as suggested by the exploded nature of FIG. 1) of the AFM is desirable so that the mask may be cleansed without damaging sensitive electronic components within the AFM or other electronic components of the mask. The modular construction permits field serviceable replacement of the AFM as needed if damaged, contaminated, or if it has reached its end of life.

There are preferably provided on the surface of the mask, preferably on either side of the orifice 106, a plurality of mounting plates 108 having mounting rings, and/or orifice shields 110 to enable interconnection of other electronic components, such as a battery module 112, and a microcontroller module 114, to the mask housing 104, wherein the microcontroller module may also comprise a Bluetooth, BLE, wifi, and/or other electronic capabilities as desired. Each battery module 112 and the microcontroller module 114 is preferably retained and contained by a twist, or snap-on, cover 116. There is wiring within the mask housing 104 adapted for interconnecting these electronic components with the AFM 102, 102', 102".

The snap ring 117, mounting plates 108, mounting rings/orifice shields 110, twist, or snap-on, cover 116, and any related hardware, are adapted to appropriately sealably interconnect components to the mask housing 104, or into orifices 106 in the mask housing, as the case may be, to provide optimal protection for the user from the external environment during use, and vice-versa from preventing contaminants escaping from within the mask housing from escaping to the external environment during use.

As further indicated in FIG. 1, a breath orientation sensor panel 118 may be further provided and implemented with a reversible polarity AFM 102', comprising a breath orientation responsive AFM adapted for reversing polarity (direction) of a deflective electromagnetic field adapted for deflecting harmful particles depending upon sensed ingress or egress of breath/airflow to or from the mask housing 104 environment.

Further, the breath orientation sensor 118 may comprise other sensors, in addition to breath orientation, such as breath pressure, CO2, and moisture sensing, able to be employed to cater to specific safety and protection concerns of front-line medical workers, law enforcement, military, or other professionals.

Figure 2:
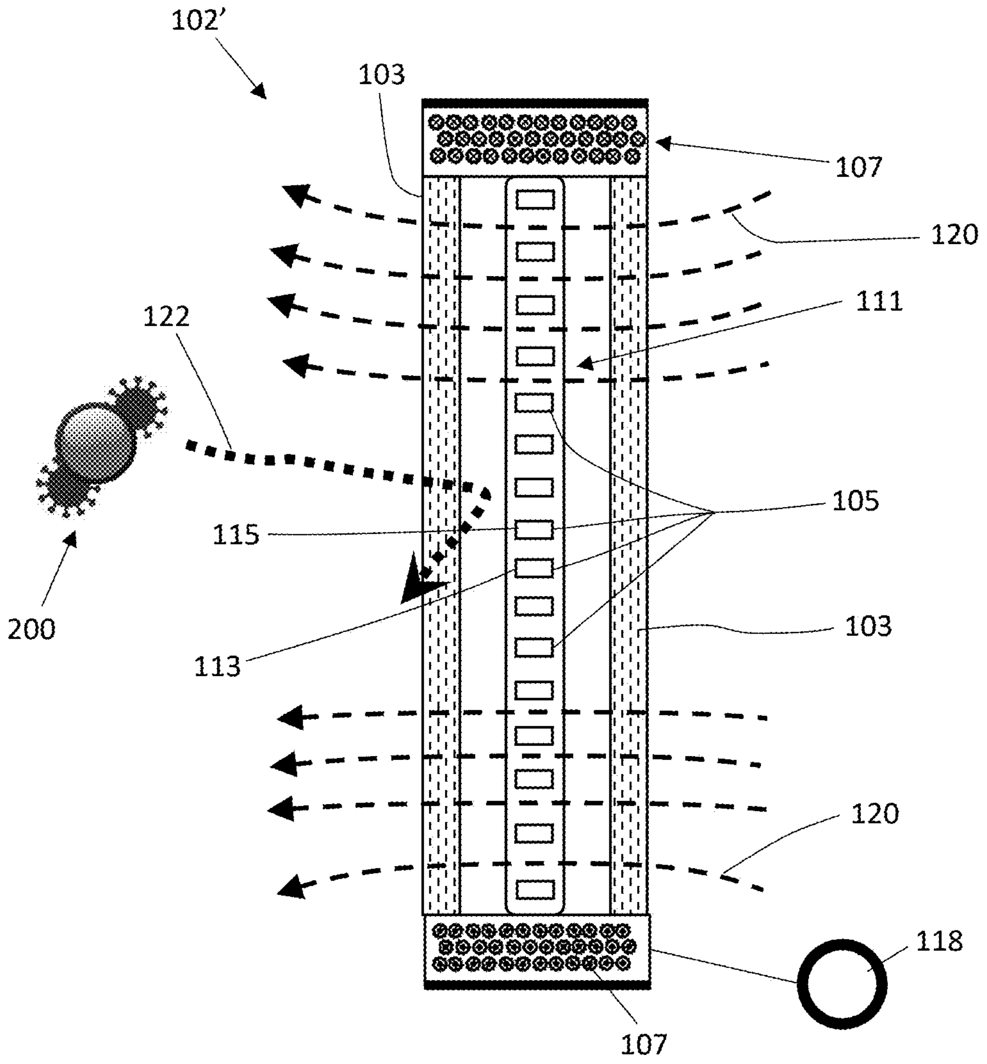
FIG. 2 is a side cross section view of an AFM together with a breath orientation sensor, and illustrating how viruses on an ionized water droplet are repelled from entry to within a mask area.

Referring now to FIG. 2, there is shown an AFM 102' connected to a breath orientation sensor 118. More specifically, FIG. 2 illustrates a breath intake cycle for the electronics and control of the AFM 102'. The design optimized plates 105 of the E-field (EF) generator 111 preferably comprise two non-contiguous opposing spiraled portions 113, 115 which ionize incoming viral droplets (e.g., viruses which have engaged with a water droplet), or dust particulates, 200 drawn near and into the AFM 102' at the mask orifice 106 due to the wearer's inhale breath draw.

Figure 5:
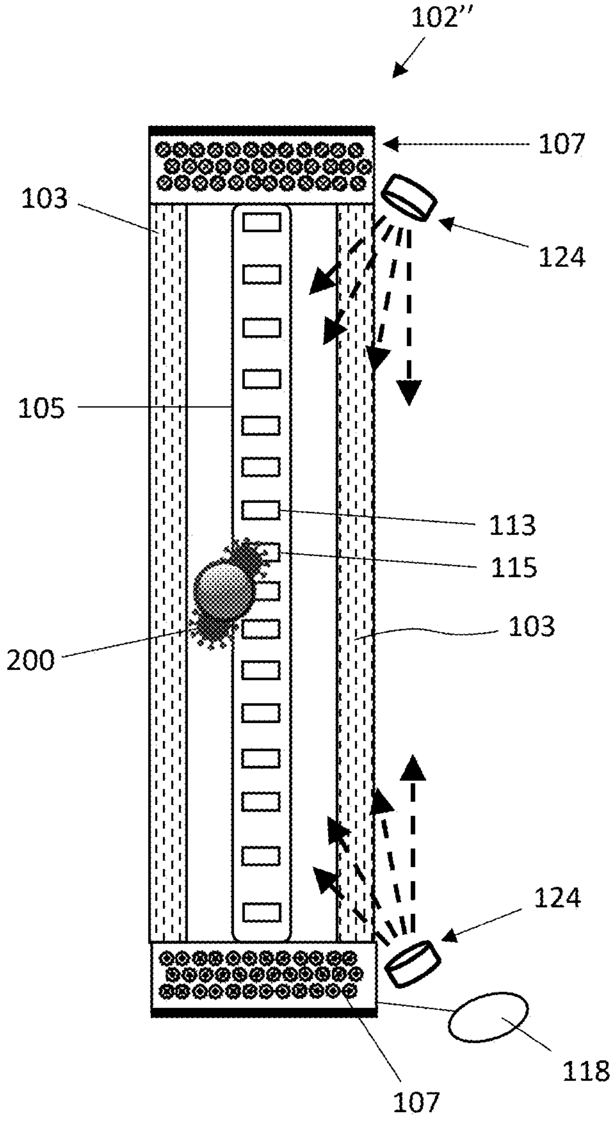
FIG. 5 is side cross section view of an AFM and UV sterilizer combination, and illustrating how viruses on an ionized water droplet are repelled from entry to within a mask area.

The breath orientation sensor 118 further preferably determines breath direction (i.e., orientation sensing) and breath pressure sensing inside the mask cavity formed by the mask housing 104. Thus, the breath orientation sensor 118 detects the beginning of an inhale cycle and activates the EMF generator polarization coil 107 to generate an electromagnetic field represented at 120 to appositively repel as shown at 122 ionized particulates 200 against an inhalation flow gradient. Lighter particulates 200 will be more subject to EMF generator 107 coil polarization action, while light-to-heavier particulates will be trapped within EF generator plates 105 as shown in FIG. 5. The shields 103, which are preferably oligodynamic and hydrophobic in composition (that is they are preferably comprised at least partially of oligodynamic and/or hydrophobic materials), and they will provide an additional layer of protection and sterilization, since repelled particulate matter 200 may come into contact with the shields, and the shields' oligodynamic properties would then naturally tend to kill viruses and bacteria 200 that come into contact with them as is known.

As shown in FIGS. 1 and 5, an optional UV panel 124 may be provided as part of an alternative embodiment AFM 102" for use with a mask 100". The UV panel 124 provides additional sterilization upon demand, since there may be provided a programmable and on/off cyclable UV control when the mask 100" is, or is not, in use. The directional UV radiation from the UV panel 124 is directly targeted upon the orifice, or mask aperture, 106 away from user's face. Power management oversight, sensing monitoring and control, data logging, and mobile device interface is provided by the microcontroller 114. The battery 112, which powers the EF generator 105, the EMF generator 107, the breath orientation sensor 118, the UV panel 124, and their microcontroller electronic control system 114, is illustrated together with an integrated charger at 112. The mask 100, 100', 100" is designed to be field serviceable. Therefore, there are provided twist or snap-on covers 116 to provide moisture sealing access covers to permit replacement of the microcontroller 114 and the battery 112, while the orifice shields 110 provide internal mount scaffold and user facial protection.

Figure 3:
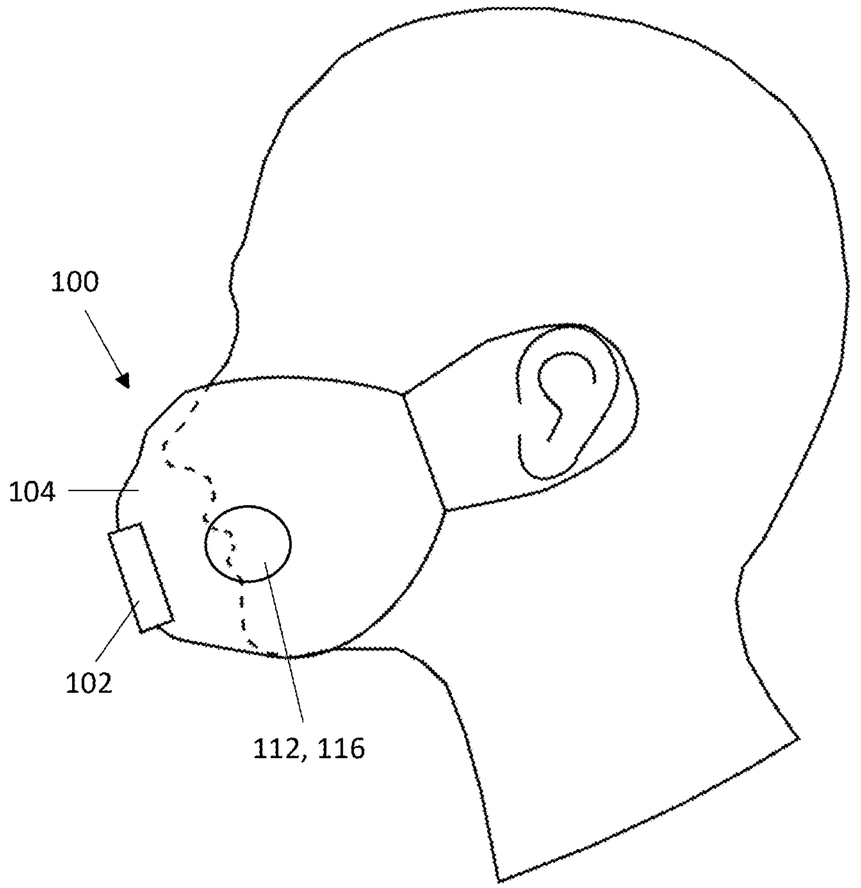
FIG. 3 is a side view of an AFM contained in a shielding device and removably held within a face mask orifice.

Referring now to FIG. 3, there is provided a side view of an electronically enabled mask 100 having an AFM 102 preferably removably held within a mask housing 104 orifice. The electronically-enabled mask's 100 housing 104 is shown held in its preferably-worn position covering the user's mouth and nose by ear loops 119 extending around the user's ears. To power the electronics of the mask 100, there is provided a Li-ion battery module 112 and cover 116.

Figure 4:
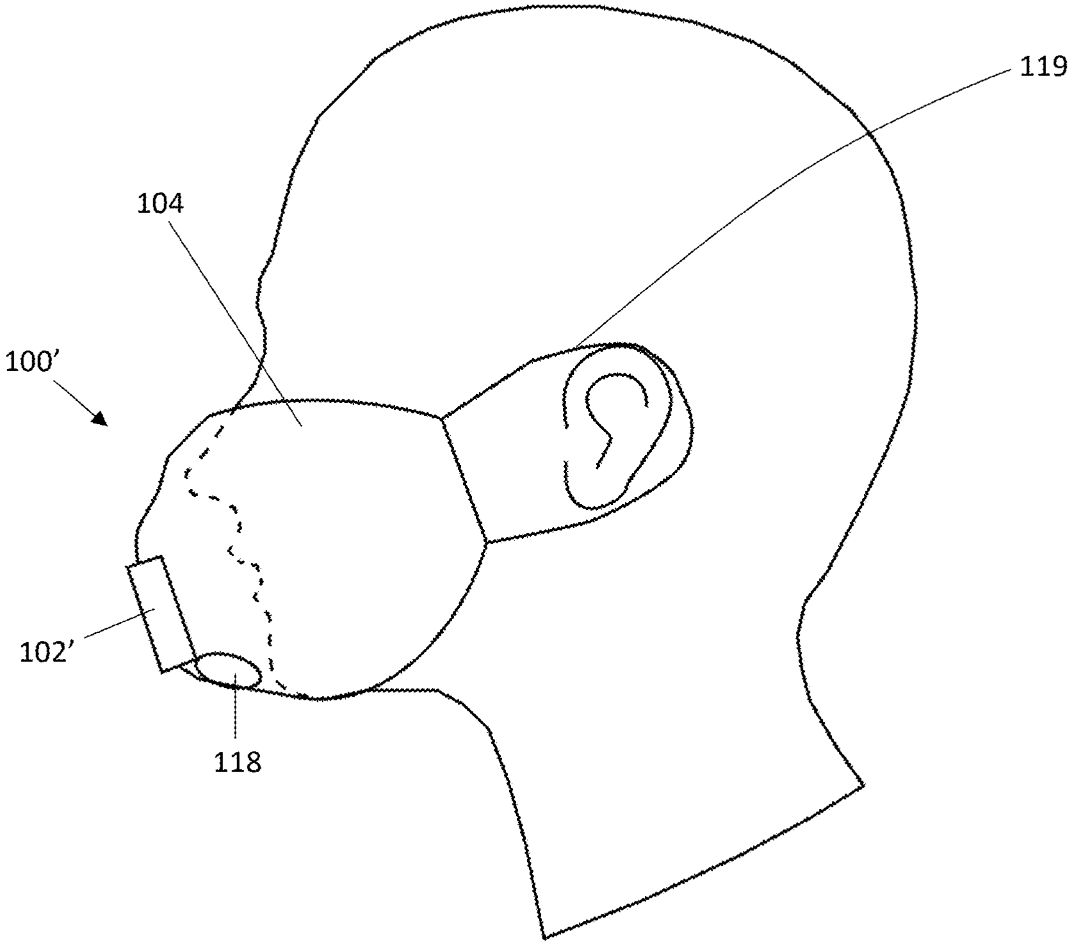
FIG. 4 is a cross section side view of an AFM contained in a shielding device and operably connected with a breath orientation sensor, both removably held within one or more orifices within a face mask.

Referring now to FIG. 4, there is shown a side view of an electronically enabled mask 100' having an AFM 102' preferably removably held within a mask housing 104 orifice. The electronically-enabled mask's 100 housing 104 is shown held in its preferably-worn position covering the user's mouth and nose by ear loops 119 extending around the user's ears. To power the electronics of the mask 100', there is provided a Li-ion battery module 112 and cover 116. The AFM 102' differs from the AFM 102 in that there is further provided a breath orientation sensor 118 providing one or more of breath direction and breath pressure sensing capability adapted for use in electronically controlling polarity (direction) of the electromagnetic field generated by the EMF generator (coil) 107 depending on whether the breath is exhaling or inhaling. Further, breath pressure sensing by the breath orientation sensor 118 optionally serves as a power-saving measure, depending on the degree of breath pressure detected within the mask enclosure (i.e., how hard the user is breathing), since this serves to allow control (reducing or increasing) of battery power while still successfully repelling harmful particulates 200. FIG. 4 shows an optional CO2 sensor 126 for enabling internal data logging of CO2 level information inside the mask.

Referring now to FIG. 5, there is provided an AFM 102" adapted for use with a UV sterilizer 124. During use, there will be trapped ionized viral particulates 200 within EF generator plates 113, 115 of the EF generator 105, as shown. The shields 103 comprising oligodynamic (and hydrophobic) shielding, provide an additional static layer of protection and sterilization as described previously. A smart UV LED panel 124 is arranged to project UV radiation outwardly in direction away from the user's face and may thus be activated (either automatically and/or via a manual on/off switch) to provide an additional dynamic layer of protection. The primary objective of such UV radiation is to sterilize the frontal mask cavity and AFM 102", but it may also screen incoming air entering the mask cavity. The UV panel 124 is smart and user programmable and may be adapted for use through automated monitoring of battery level and energy consumption, to regulate use of the UV panel only in a manner that ensures optimal battery life between charges.

Figure 6B:
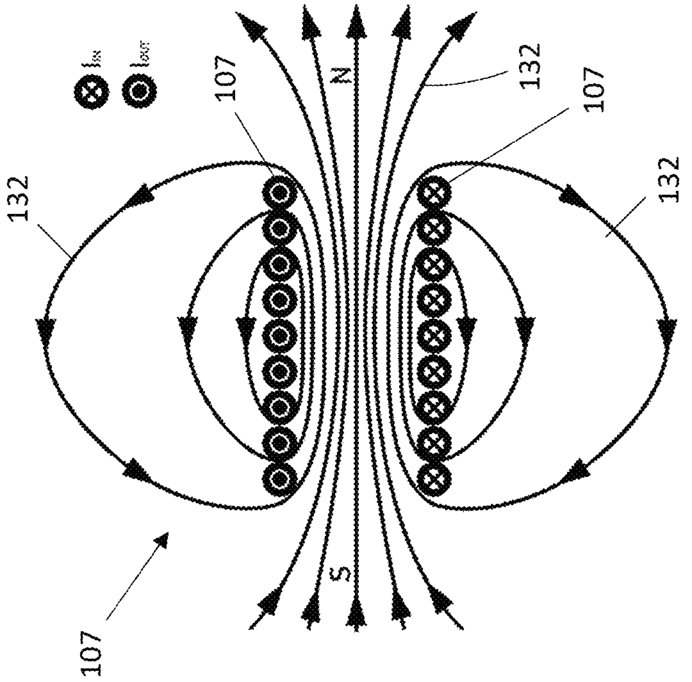
FIG. 6B is the reverse of the EMF generator pattern shown in FIG. 6A accomplished by reversing the polarity, or direction, of the current running through the EMF per a detection of breath exhalation (right to left) sequence.
Figure 6A:
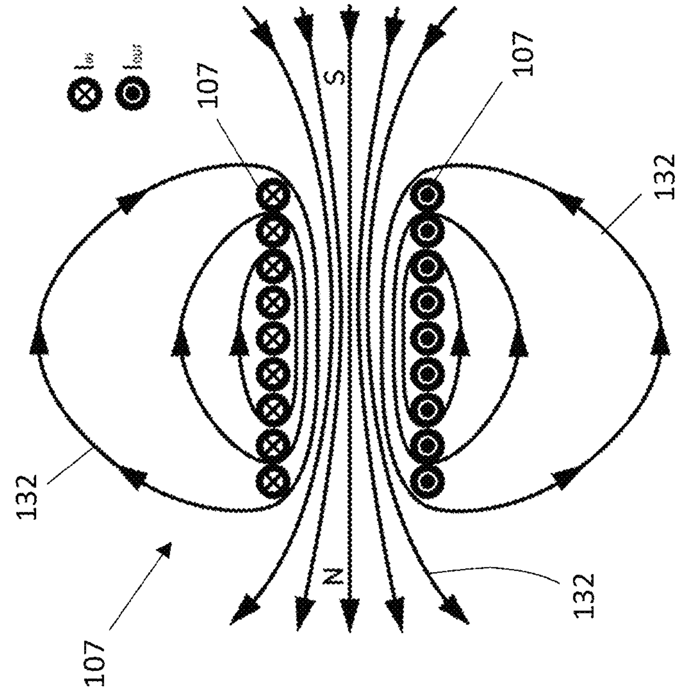
FIG. 6A is an illustration of a reversible EMF generator pattern per a detection of breath inhalation (left to right) sequence.

FIGS. 6A and 6B are illustrations of a reversible EMF generator pattern per a detection of breath inhalation (left to right breath travel) sequence, per FIG. 6A, and a breath exhalation (right to left breath travel) sequence, per FIG. 6B. Thus, FIGS. 6A and 6B illustrate the reversible nature and action of the EMF (Electromagnetic) generator polarization coil 107. The magnetic field 132 produced by the current-carrying wire of the EMF generator coil 107 is perpendicular to the wire, or coil, 107, and the flux intensity of the magnetic field varies with the amount of current I (see X for I in, and O for I out) which passes through the coil.

Such magnetic flux is enhanced by bending the wire into the shape of a coil (e.g., EMF generator coil 107), and the electromagnetic self-induction is put into practical use in the coil construction of the EMF generator 107 as shown. The differing directions of the induced magnetic fields, as per FIGS. 6A and 6B, is dependent upon the direction of current flow in the EMF generator coil 107. Note therefore that the direction of the internal coil magnetic flux 132 is right-to-left in the upper portion of FIG. 6A where the upper cross-section slice of the EMF coil wires 107 are each represented with X's in them at that location, indicating current flow into the page, and with O's represented at the lower cross-section slice of the EMF coil wires 107 in FIG. 6A, suggesting that the current I is flowing out of that page. Whereas the direction of the magnetic flux 132 is left-to-right in the upper portion of FIG. 6B as the opposite direction of current flow is applied to the coil wires, namely the current I is shown as going into the FIG. 6B at the lower cross-section slice of the EMF coil wires 107 at that lower location of the coil wires. This illustrates that the direction of the current I has been reversed for FIG. 6B so that the magnetic flux would be illustrated as being opposite in FIG. 6B compared to FIG. 6A. The direction of the coil current I is controlled by an electronic driver under command of breath directional sensor 118 actively monitoring breath cycle activity inside the cavity of the mask 100', 100".

Figure 7A:
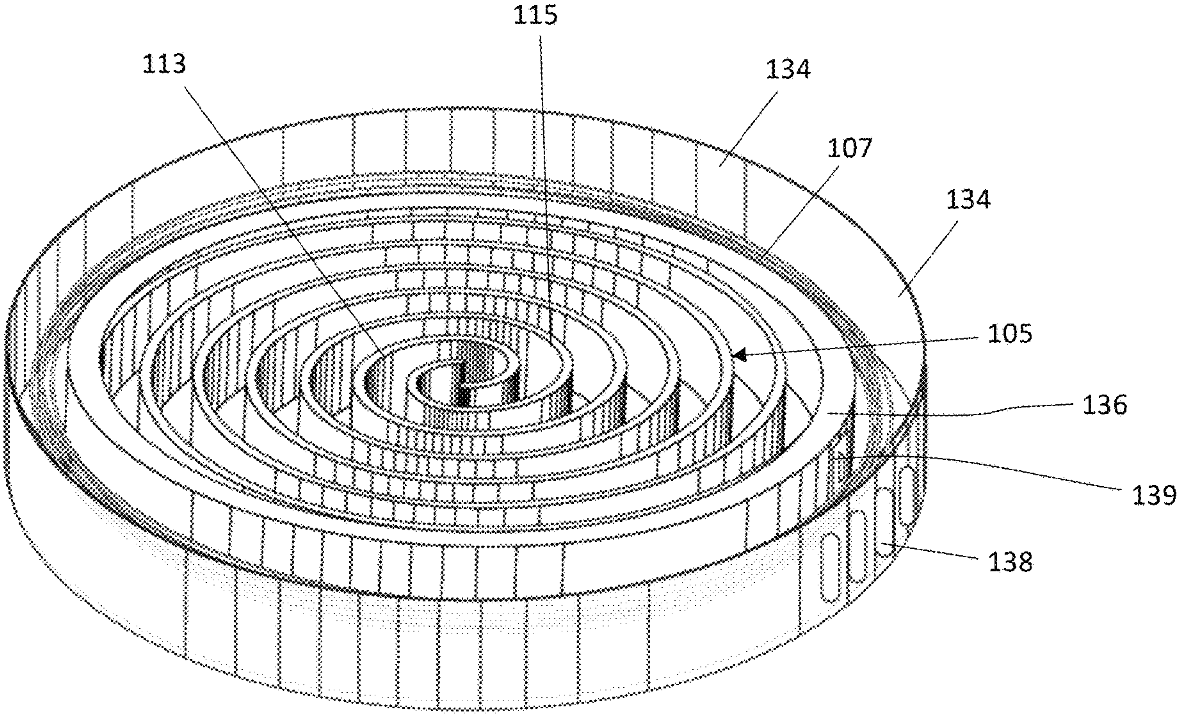
FIG. 7A is a perspective view of internal portions of an AMF comprising an EF generator and an EMF generator, and also showing an outer peripheral case portion.
Figure 7B:
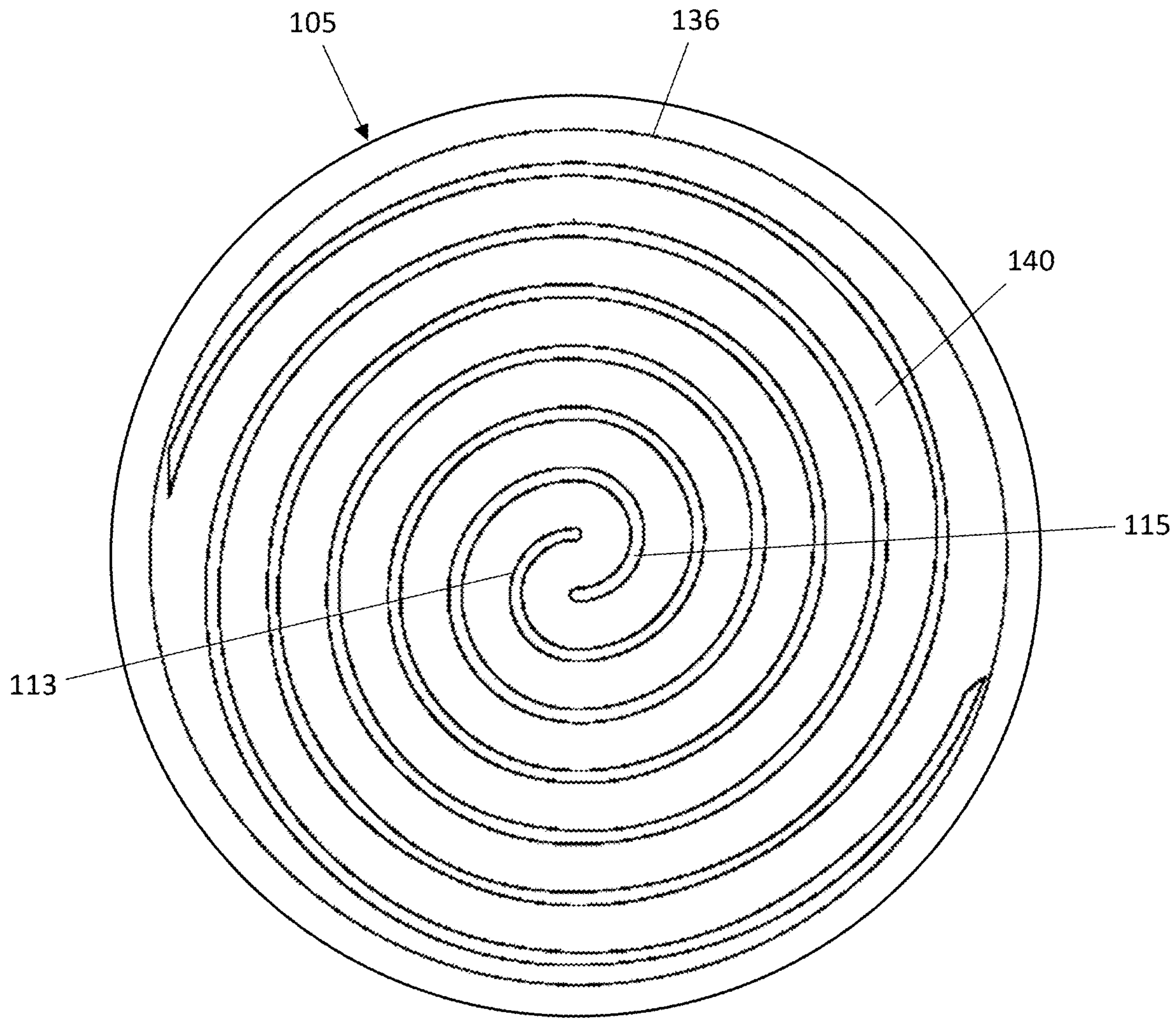
FIG. 7B is a cross section plan view of a portion of the AMF of FIG. 6, comprising the EF generator.

Referring now to FIGS. 7A and 7B, there is shown a perspective view of internal portions of an AFM 102, 102', 102", such as the EMF generator 107 and the EF generator 105, which are held together with an outside circumferential outer housing 134 to enable self-fastening friction seal to allow the AFM 102, 102', 102" to be snapped into place in a specific position relative to an orifice in the mask housing 104. Further, the AFM 102, 102', 102" comprises an internal housing 136 which separates the EMF generator 107 and EF generator 105. There are four high-conductivity (i.e., gold) contacts 138 on the housing 134, two for the EMF generator 107, and two for the EF generator 105. The alignment of the housing 134 permits the high-conductivity contacts 138 to be electrically engaged between the AFM 102, 102', 102" and mask. There is another set of contacts 139 on the internal housing 136 for power and control to the EF generator 105.

Thus, there is sandwiched between the external housing 134 and the internal, or scaffold, housing 136, is the EMF generator polarization coil 107, wherein the wires of the coil are wrapped around the internal housing 136. The EF generator plates 105 compromise dual opposing concentric spirals spiraling from a central location outwardly until the spirals approach and engage the internal housing 136 forming the interior assembly of the AFM 102, 102', 102".

Referring to FIG. 7B, the space between the plates 113, 115 of the EF generator 105 is occupied by a porous hydrophobic dielectric material 140. The dielectric material 140 provides a scaffold for the plates 113, 115 assembly and accentuates the electromagnetic field produced by the EMF generator coil 107.

Figures 8A, 8B, 8C:
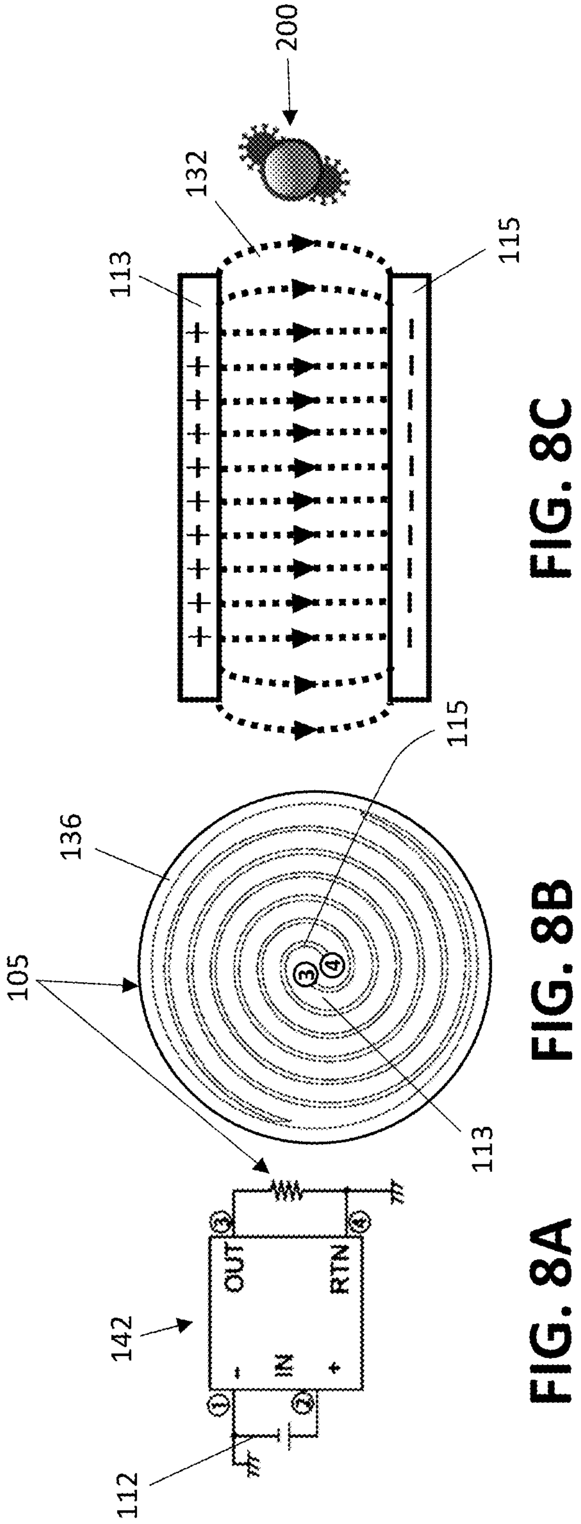
FIGS. 8A-8C are a block diagram and illustrations enabling discussion of electrical operation of the EF generator to generate an EF generator pattern for diverting particulates from ingress (or egress) from a mask having an AMF.

Referring to FIGS. 8A-8C, there is shown the EF generator 105 electrical operation of the AFM 102, 102', 102". In FIG. 8A, a low voltage Li-ion battery 112 voltage is applied to small-footprint low-current, high-voltage module 142. Such high-voltage modules 142 are commercially available for photomultiplier tubes and ionization chambers, and can operate from 5 to 12 Volts. In FIG. 8B, the connections at contacts 3 and 4 from the module they are applied across the plates 113 and 115 of the EF generator 105. The generated electric field is electrostatic in nature as shown at 132 in FIG. 8C. This provides the ionization energy that impacts all viral droplets and particulates 200 that enter into the area of the EF generator 105 field 132. Once ionized the particulates 200 are trapped against the plate of opposite polarity (113 or 115), but additionally become highly susceptible to an external electromagnetic field, which is generated and applied by the EMF generator 105.

Figure 9:
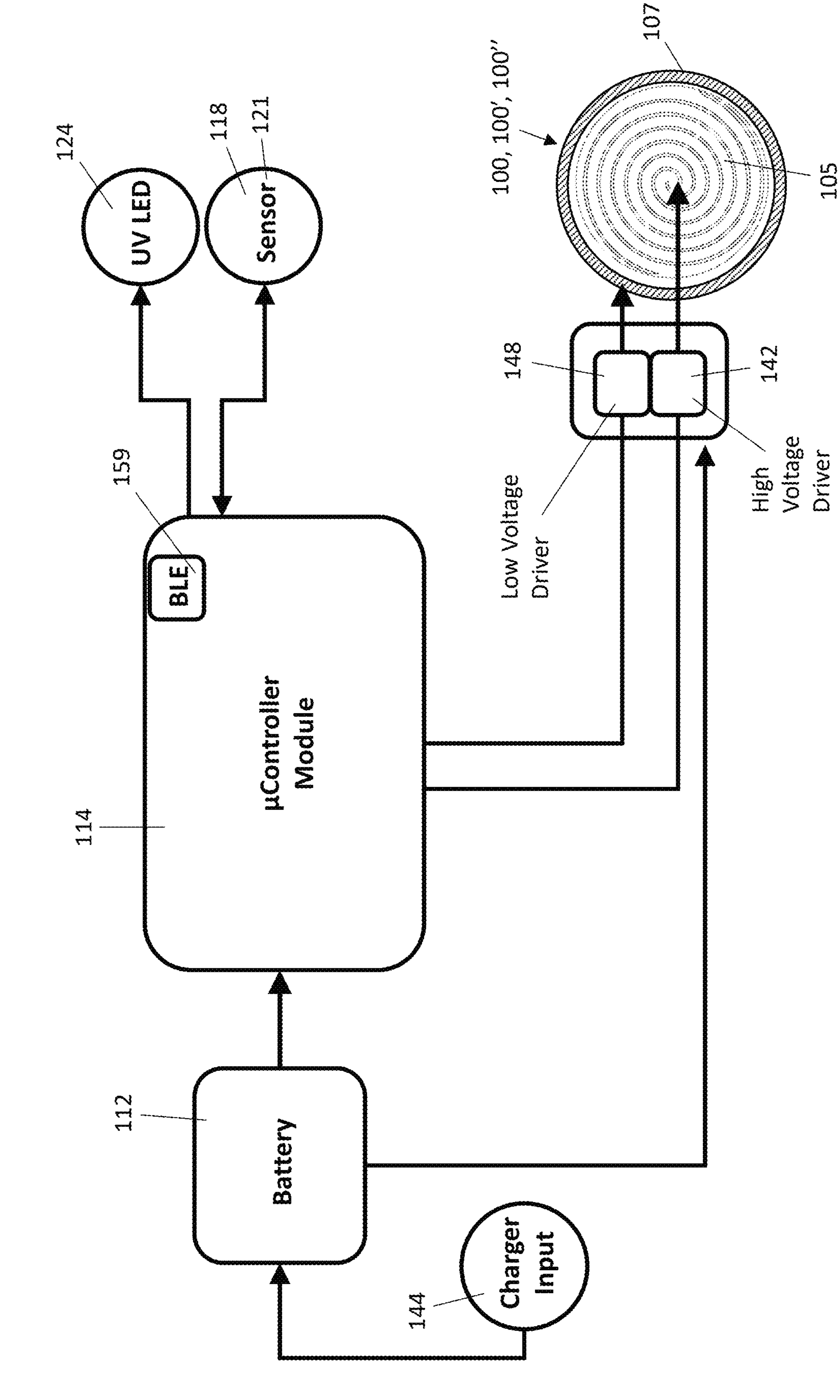
FIG. 9 shows a block diagram with electronic subsystems needed for powering and control of an AMF and a mask containing an AMF and related sensors and electronics.

Referring now to FIG. 9, there is shown an electrical block diagram of the overall electronically enabled mask 100, 100' (with the addition of breath orientation sensor 118), 100" (with the addition of UV sterilizers 124) assembly is shown in FIG. 9. A li-ion battery cell 112 provides the power rail for the entire device. It is charged via an intrinsic and smart charging interface 144 which will monitor the battery 112 state-of-charge (SOC) and shutdown charging current when the cell 112 has reached designated capacity. The systems of the AFM 102, 102', 102" are governed with a microcontroller module 114 complete with I/O (Input/Output) to permit monitoring and control. The microcontroller module 114 provides power management oversight for all AFM embodiments 102, 102', 102". The microcontroller module 114 also provides monitoring of any breath orientation sensors 118, and control of any IJV sterilizers 124. Still further, the microcontroller 114 may provide data logging and mobile device interface to a cell phone, for example (if any). Overall, the AFM embodiments 102, 102', 102" thus comprise a multi-tier active electronic air filtration system. The system may be Bluetooth, BLE, or Wifi enabled as indicated at 159 to allow programmability and interface to an smart phone application, and there may be optionally provided sensors, for example CO2 sensors 121, for data logging purposes.

Figure 10A:
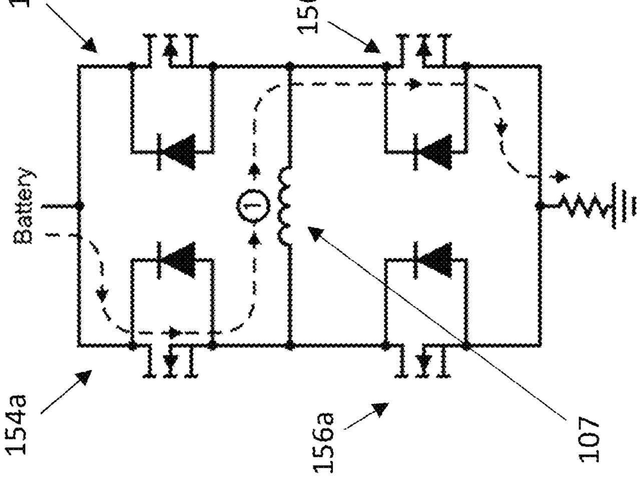
FIGS. 10A-10D are illustrations of energizing sequences of the EMF generator driver, comprising inhale, rest, exhale, and rest sequence functions, responsive to breath orientation sensing and electronic control.

FIGS. 10A-10D show the four operational modes of a cost-effective half bridge MOSFET driver designed for inductive load control. Non-overlapping gate drives prevent shoot through currents and high efficiency power control. FIG. 10A shows a first mode so that when breath inhale is detected the polarization coil is directionally activated by turning on the appropriate high-side transistor 154*a* and low-side transistor 156*b* as shown. In this polarization orientation the current is shown as traveling from left to right through the EMF generator polarization coil 107. This will be performed by Pulse-Width Modulation (PWM) control to conserve battery energy. The amplitude of the perceived current, and therefore the strength of the induced magnetic field, of the EMF generator's polarization coil is governed by auto-adjusting the duty cycle of the applied PWM signal.

The duty cycle is proportional to the amplitude of the signal of the breath orientation sensor 118 within the mask cavity.

Figure 10B:
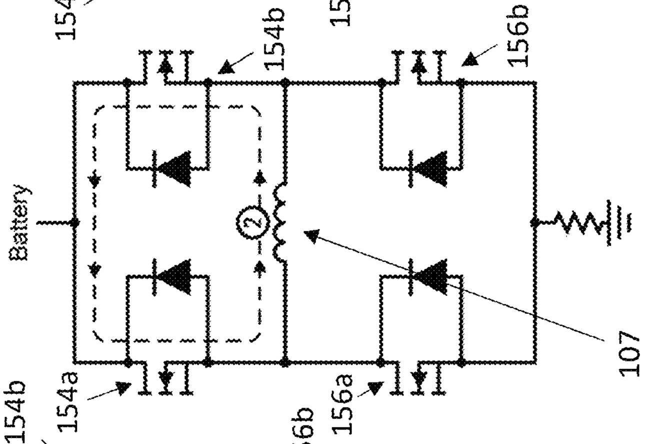

FIG. 10B shows a second mode, comprising a resting mode. In this mode, at the top of the user's breath inhalation, the low-side transistors 156*a*, 156*b* will be turned-off as indicated. This permits recirculation of the coil current through the high-side free-wheeling transistors/diodes 154*a*, 154*b* and dissipation through the power rail. By doing so, the magnetic field 132 within the polarization coil collapses, and is prepared to be switched to the opposite direction for the exhale breath cycle also known as the third mode. This also helps to reduce current spikes from the back EMF coil energy and protects the transistors 154, 156 and battery 112.

Figure 10C:
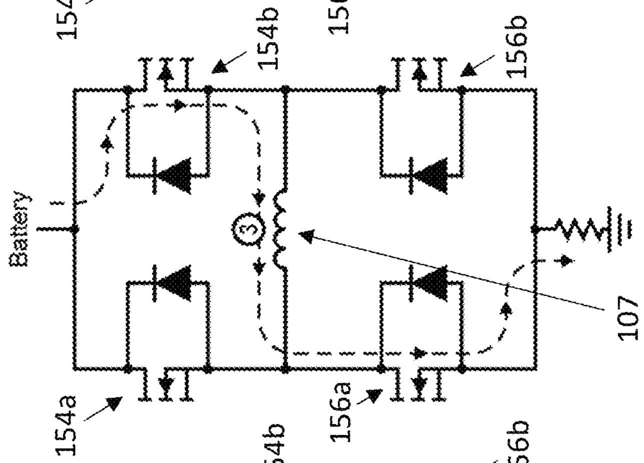

FIG. 10C shows a third mode so that when breath exhale is detected the polarization coil is directionally activated in an opposite direction to the first mode by turning on the appropriate high-side transistor 154*b* and low-side transistor 156*a* as shown. In this way, or polarization orientation, the current is shown as traveling from right to left through the EMF generator polarization coils 107. Again, this will be performed by Pulse-Width Modulation (PWM) control to conserve battery energy. And again, the amplitude of the perceived current, and therefore the strength of the induced magnetic field, of the EMF generator's polarization coil is governed by auto-adjusting the duty cycle of the applied PWM signal. The duty cycle is proportional to the amplitude of the signal of the breath orientation sensor 118 within the mask cavity.

Figure 10D:
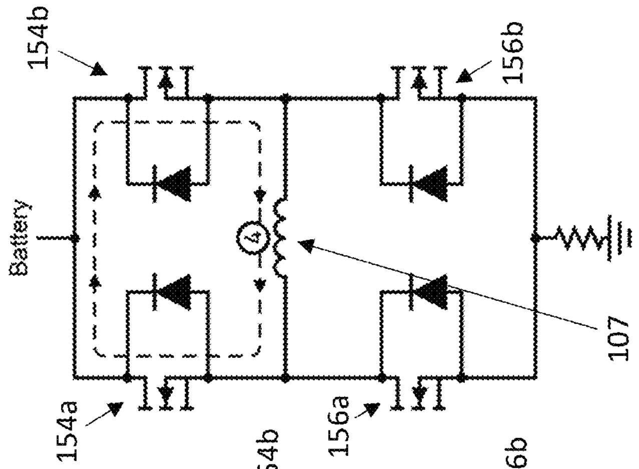

Finally, FIG. 10D shows a fourth mode, also comprising a rest mode. In this mode, at the top of the user's breath inhalation, the low-side transistors 156*a*, 156*b* will be turned-off again as indicated. This permits recirculation of the coil current through the high-side free-wheeling transistors/diodes 154*a*, 154*b* and dissipation through the power rail. By doing so, the magnetic field 132 within the polarization coil collapses, and is prepared to be switched back again to the opposite direction for the inhale breath cycle, or the first mode. This also helps to reduce current spikes from the back EMF coil energy and protect the transistors 154, 156 and battery 112.

Thus, it will be understood that these four modes shown and described in connection with FIGS. 10A-10D will be repeated at all times as the mask 100, 100', 100" is powered on and is being worn.

In the preceding description, numerous details were set forth. It will be apparent, however, to one skilled in the art, that the present invention may be practiced without some of these specific details. Additionally, one of ordinary skill in the art will recognize the inventive principles disclosed are not limited to the embodiments disclosed herein, and that various aspects of the disclosed embodiments can be combined to achieve yet additional embodiments. In some instances, well-known structures and devices are shown in block diagram form, rather than in detail, in order to avoid obscuring the present invention.

While a preferred embodiment of the present disclosure has been shown and described, it will be apparent to those skilled in the art that many changes and modifications may be made without departing from the claimed subject matter in its broader aspects. For example, it will be appreciated that one of ordinary skill in the art may mix and match the various components of the various embodiments of the claimed subject matter without departing from the true spirit of the claims. The appended claims are therefore intended to cover all such changes and modifications as fall within the true spirit and scope of the invention.

What is claimed is:

1. An air filter module (AFM) adapted for use with a face mask for being worn on a user's face and enclosing the user's nose and mouth, the face mask defining an orifice adapted for retaining the AFM and positioned in front of the user's mouth when wearing the mask, the AFM adapted for prevention of very fine particulate matter, which may carry viruses, bacteria, and other harmful substances, from entry into a wearer's mouth and nose from the wearer's environment, and for prevention of passage of such very fine particulate matter from the wearer's mouth and nose into the wearer's environment, with less impediment of the wearer's breathing or speaking, comprising:

a. an electrostatic field (EF) generator comprised of at least one spiraled plate portion;

b. an electromagnetic field (EMF) generator adjacent said EF generator and adapted for providing directional polarization to particles ionized by said EF generator, wherein said EMF generator is wrapped around said EF generator such that the direction of the magnetic field of said EMF generator travels substantially perpendicularly through said EF generator;

c. anterior and posterior porous frame portions, said EF generator being retained within said porous frame portions, said porous frame portions adapted for being retained within the orifice defined in said face mask; and d. an electronic system adapted to be battery powered and operatively connected with, and adapted to selectively energize, said EF generator and said EMF generator, said electronic system further being adapted for actively controlling and reversing polarity of said EMF generator to control deflection of ionized very fine particulates.

2. The AFM of claim 1, further comprising a face mask, wherein the AFM and said face mask in combination, comprises:

a. a face covering member adapted for being worn on a user's face and enclosing the user's nose and mouth, said face mask defining an orifice adapted to be positioned in front of the user's mouth when wearing the mask; and b. at least one AFM, wherein the AFM is removably retained within the orifice of said face covering member, wherein said EF comprises opposing non-contiguous spiraled plate portions.

3. The AFM of claim 1, wherein at least a portion of said porous frame portions are comprised of polytetrafluoroethylene (PTFE) or similar material.

4. The AFM of claim 1, wherein said porous frame portions further comprise oligodynamic material for killing live virus particles after contact with said porous frame portions.

5. The AFM of claim 1, further comprising:

a. a breath parameter sensor; and b. an electronic circuit connected to said breath parameter sensor and said EMF generator adapted for actively reversing polarity of said EMF generator responsive to a detected breath parameter of exhalation and inhalation for directing harmful particles towards said porous frame portions.

6. The AFM of claim 5, wherein said breath parameter sensor and said electronic circuit are adapted for varying the amplitude of the reversing polarity of said EMF generator responsive to a detected breath parameter of relative pressure within said mask.

7. The AFM and face mask combination of claim 2, wherein said electronic system to selectively energize the at least one AFM comprises an automated ON and OFF switch adapted to be operable upon detection of donning and doffing, respectively, of said mask.

8. The AFM and face mask combination of claim 2, further comprising a UV LED panel for in-situ sterilization of the at least one AFM.

9. The AFM and face mask combination of claim 8, wherein said UV LED panel may be manually selected to ON for a default sterilization time, and wherein the default sterilization time may be overridden by a user specified time.

10. The AFM and face mask combination of claim 2, further comprising a battery removably attachable to said mask and adapted for powering said mask.

11. The AFM of claim 1, further comprising a single-layer and porous dielectric medium to enhance the capacity of said EF and provide stability of the AFM.

12. An electronically-enabled mask adapted for prevention of very fine particulate matter, which may carry viruses, bacteria, and other harmful substances, from entry into a wearer's mouth and nose from the wearer's environment, and for prevention of passage of such very fine particulate matter from a wearer's mouth and nose into the wearer's environment, with less impediment of the wearer's breathing or speaking, comprising:

a. a face covering member defining an orifice adapted to be positioned during wear so as to define a cavity in front of the wearer's mouth while also making an airtight enclosure around the wearer's nose and mouth so as to channel all of the wearer's breath to pass through the orifice; and b. at least one air filter module (AFM) removably retained and sealed around a periphery thereof within the orifice opening of said face covering member, said at least one AFM comprising;

i. an electrostatic field (EF) generator for ionizing particles and viral droplets and aerosol particulates, said EF comprising at least one spiraled plate portion;

ii. an electromagnetic field (EMF) generator adjacent said EF generator and adapted for providing directional polarization to particles and viral droplets and aerosol particulates ionized by said EF generator, wherein said EMF generator is wrapped around said EF generator such that the direction of the magnetic field of said EMF generator travels perpendicularly through said EF generator;

iii. anterior and posterior porous frame portions, said EF generator being retained within said porous frame portions, said porous frame portions adapted for being retained within the orifice defined in said face mask; and iv. an electronic system adapted to be battery powered and operatively connected with, and adapted to selectively energize, said EF generator and said EMF generator, said electronic system further being adapted for actively controlling and reversing polarity of said EMF generator to control deflection of ionized very fine particulates; and c. a battery removably attached to said face covering member and adapted for powering the mask.

13. The mask of claim 12, wherein said at least one AFM further comprises anterior and posterior membrane filter portions having oligodynamic properties, and wherein said EF comprises opposing non-contiguous spiraled plate portions.

14. The mask of claim 12, further comprising an interior moisture wick and moisture alleviation and displacement channel in said mask to optimize user comfort.

15. The mask of claim 12, further comprising a removable disposable sneeze guard adapted to catch mucous discharge from a wearer's respiratory passages to allow quick enhancement of wearer comfort by replacing said sneeze guard.

16. The mask of claim 12, further comprising:

a. a breath parameter sensor; and b. an electronic circuit connected to said breath parameter sensor and said EMF generator adapted for actively reversing polarity of said EMF generator responsive to a detected breath parameter of exhalation and inhalation for directing harmful particles towards said porous frame portions.

17. The mask of claim 16, wherein said breath parameter sensor and said electronic circuit are adapted for varying the amplitude of the reversing polarity of said EMF generator responsive to a detected breath parameter of relative pressure within the mask.

18. The mask of claim 12, wherein said electronic system is adapted to selectively energize said at least one AFM and comprises an automated ON and OFF switch adapted to be operable upon detection of donning and doffing, respectively, of the mask.

19. The mask of claim 12, further comprising a UV LED panel for in-situ sterilization of said at least one AFM.

20. The mask of claim 19, wherein said UV LED panel may be manually selected to ON for a default sterilization time, and wherein the default sterilization time may be overridden by a user specified time.

21. The mask of claim 19, wherein said at least one AFM further comprises a single-layer and porous dielectric medium to enhance the capacity of said EF and provide stability of the at least one AFM.

* * * * *